United States Patent
Trethewey

(10) Patent No.: US 9,145,707 B2
(45) Date of Patent: Sep. 29, 2015

(54) POST DRIVER EXTRACTOR

(75) Inventor: Reginald Trethewey, Deepwater (AU)

(73) Assignee: Ashley Dean Olsson, Goulburn, New South Wales (AU)

( * ) Notice: Subject to any disclaimer, the term of this patent is extended or adjusted under 35 U.S.C. 154(b) by 830 days.

(21) Appl. No.: 13/497,511

(22) PCT Filed: Sep. 21, 2010

(86) PCT No.: PCT/AU2010/001227
§ 371 (c)(1),
(2), (4) Date: Apr. 10, 2012

(87) PCT Pub. No.: WO2011/032232
PCT Pub. Date: Mar. 24, 2011

(65) Prior Publication Data
US 2012/0279737 A1    Nov. 8, 2012

(30) Foreign Application Priority Data
Sep. 21, 2009  (AU) ................. 2009904545

(51) Int. Cl.
*E04H 17/26*   (2006.01)
*E21B 19/00*   (2006.01)
*A01G 17/16*   (2006.01)

(52) U.S. Cl.
CPC ............. *E04H 17/265* (2013.01); *A01G 17/16* (2013.01); *E21B 19/00* (2013.01); *Y10T 29/49822* (2015.01)

(58) Field of Classification Search
CPC ...... E04H 17/26; E04H 17/265; A01G 17/16; E21B 19/00
USPC .......... 173/90, 29, 53, 55, 170; 248/156, 161, 248/30, 545; 254/30, 31, 124, 129, 130, 254/131, 133, DIG. 1, DIG. 3
See application file for complete search history.

(56) References Cited

U.S. PATENT DOCUMENTS

| 1,185,627 A * | 6/1916 | Brown ............................. 254/31 |
| 1,234,243 A * | 7/1917 | Williams ....................... 254/259 |
| 1,916,463 A * | 7/1933 | Carrel ............................ 254/132 |
| 2,826,392 A * | 3/1958 | Kohorst ........................... 254/31 |
| 3,712,389 A * | 1/1973 | Smoak ............................ 173/126 |
| 3,991,976 A * | 11/1976 | Skinner ........................... 254/30 |
| 4,161,310 A | 7/1979 | Parker |
| 4,738,433 A * | 4/1988 | Hoff ................................. 254/30 |
| 5,022,632 A * | 6/1991 | Beideck ........................... 254/30 |

(Continued)

FOREIGN PATENT DOCUMENTS

| AU | 2002300372 | 6/2003 |
| AU | 2003204267 | 1/2004 |

(Continued)

*Primary Examiner* — Scott A. Smith
(74) *Attorney, Agent, or Firm* — Kirton McConkie; Evan R. Witt

(57) ABSTRACT

A device for driving and extracting a post having a hollow barrel having one closed end and one open end for receiving the post, and two longitudinal handles, wherein at least one handle is pivotally fixed at the closed end of the barrel and releasably secured with a fastener at the other end such that the is utilized to facilitate driving of the post or can be released to act as a lever for extracting the post. The device also has a striker disc fixed within the barrel at the closed end with a void between the disc and closed end of the barrel to muffle the noise created during driving of a post.

20 Claims, 3 Drawing Sheets

(56) References Cited

U.S. PATENT DOCUMENTS

| | | | |
|---|---|---|---|
| 5,499,795 A * | 3/1996 | Mathews | 254/30 |
| 5,713,559 A * | 2/1998 | McClarin et al. | 254/124 |
| 5,833,215 A * | 11/1998 | Vandenburg | 254/30 |
| 6,302,376 B1 * | 10/2001 | Williams | 254/30 |
| 7,175,141 B2 * | 2/2007 | Bolinder et al. | 248/156 |
| 7,798,384 B2 * | 9/2010 | Paske | 227/15 |
| 7,837,177 B2 * | 11/2010 | McNeill | 254/30 |
| 8,230,944 B2 * | 7/2012 | Thiem | 173/90 |
| 8,701,791 B2 * | 4/2014 | Page | 173/90 |

FOREIGN PATENT DOCUMENTS

| | | |
|---|---|---|
| AU | 2007100145 | 3/2007 |
| CN | 2062149 | 9/1990 |
| WO | 2007/022577 | 3/2007 |

\* cited by examiner

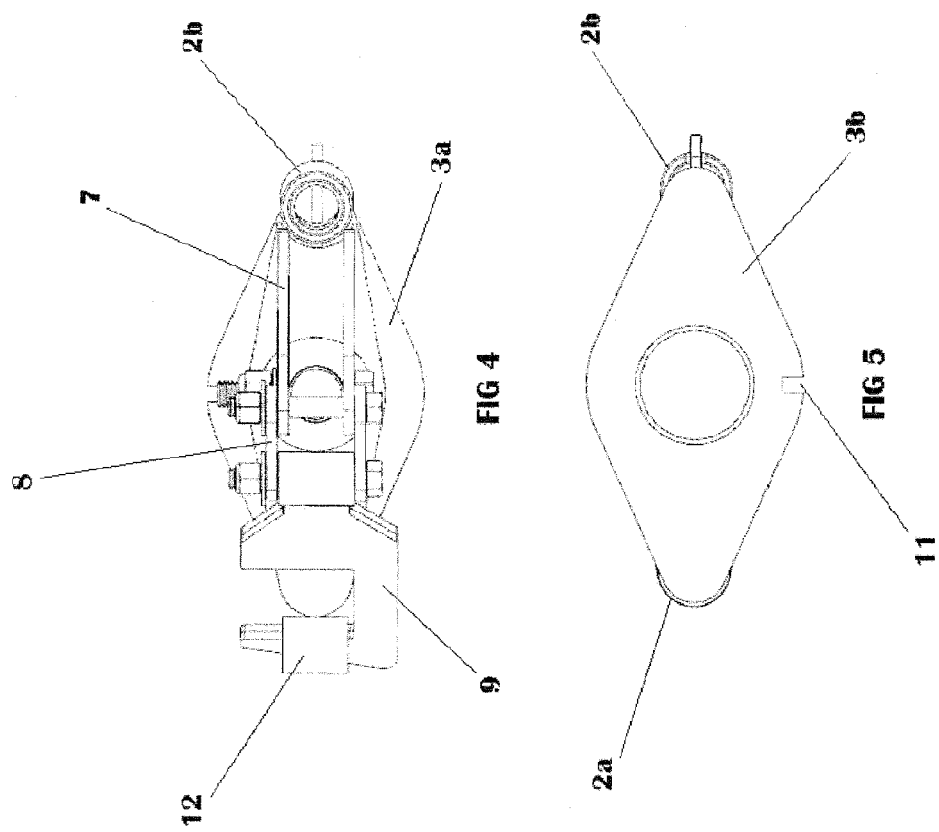

# POST DRIVER EXTRACTOR

FIELD OF THE INVENTION

This invention relates to devices for driving and extracting posts.

BACKGROUND OF THE INVENTION

Wooden stakes and metal star pickets are popular multi-purpose posts that are used in fencing or to support signs, barricades or plants. Generally, a driving device is used to drive the posts into the ground at the desired location. However, a post can easily be driven too far or can twist out of alignment and must be extracted. Also, these posts are often installed temporarily and need to be removed at some point in time. A separate device is then required to pull the post out of the ground.

In most circumstances both the driving and extracting devices are required. However, both devices are heavy and cumbersome and are difficult to carry together. Accordingly, a person will generally use the driver and return to get the extractor as needed. This is inefficient and results in wasted time and effort.

OBJECT OF THE INVENTION

It is therefore an object of the present invention to provide a device which can both drive and extract posts or at least to provide an alternative to the prior art.

STATEMENT OF THE INVENTION

According to the present invention a device for driving and extracting a post comprises a hollow barrel having one closed end and one open end for receiving the post, and two longitudinal handles, wherein at least one handle is pivotally fixed at the closed end of the barrel and releasably secured with a fastener at the other end such that said handle is utilised to facilitate driving of the post or can be released to act as a lever for extracting the post.

Preferably a striker disc is fixed within the barrel at the closed end with a void between the disc and the closed end of the barrel.

Preferably one handle is permanently fixed and one handle is pivotable.

Preferably a hook clamp is attached to the pivotable handle by at least one linkage such that moving the handle results in an opposing movement of the clamp.

Preferably the handles are mounted between plates at either end of the barrel.

Preferably at least one handle is pivoted at a pivot point to a plate at the closed end of the barrel.

Preferably one handle has a linkage beyond the pivot point which carries a hook clamp.

In one form the device has a plate with a star shaped hole to receive a star picket mounted over the open end of the barrel.

Preferably the device has a retainer to restrain the clamp when in the driving position.

Preferably the fastener is a spring clip.

Alternatively, the invention resides in a method for extracting a post using the device disclosed above.

BRIEF DESCRIPTION OF THE DRAWINGS

An embodiment of the invention is now described by way of example only with reference to the accompanying drawings in which:

FIG. 4 is a plan view of the device of FIG. 1.

FIG. 5 is an underside plan view of the device of FIG. 1.

DETAILED DESCRIPTION OF THE INVENTION

Figure 3:
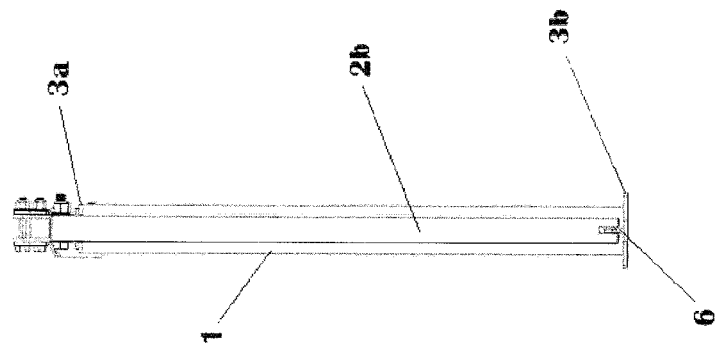
FIG. 3 is an elevation view from the right side of the device of FIG. 1.
Figure 1:
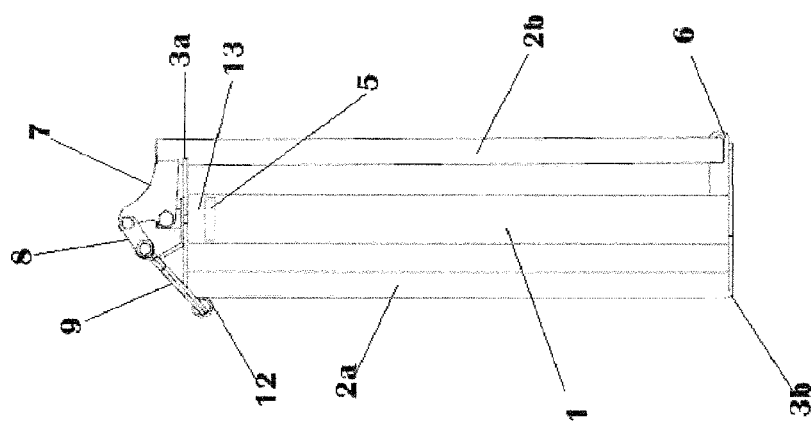
FIG. 1 is an elevation view from the front of the post driver extractor device of the present invention in the post driving configuration.
Figure 2:
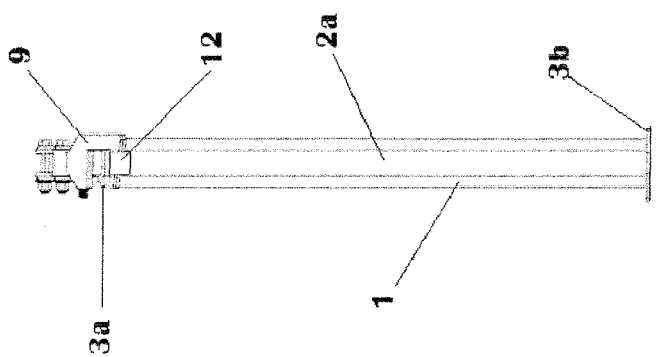
FIG. 2 is an elevation view from the left side of the device of FIG. 1.

As shown in FIGS. 1 to 5, a device for driving and extracting posts comprises two longitudinal handles 2a and 2b located either side of and parallel to barrel 1. Each end of barrel 1 and handles 2 is fixed to one of two plates 3a or 3b. Barrel 1 is a hollow tube, one end of which is closed (top end) and the other end is open (bottom end) to receive a post. Striker disc 5, being a 10 millimeter thick metal disc, is welded within barrel 1 approximately 25 millimeters from its closed end.

Barrel 1 and handle 2a are welded to plates 3a and 3b and therefore handle 2a is permanently fixed parallel to barrel 1. Second handle 2b is pivoted to plate 3a and releasably secured to plate 3b. One end of handle 2b is fixed to the long arm of L-shaped linkage 7 which is pivoted to the top surface of plate 3a and also swivels on plate 3a.

Fastener 6, which may be a spring clip or other suitable fastener, secures the other end of handle 2b to plate 3b and can be released to allow handle 2b to pivot upwards. The short arm of L-shaped linkage 7 pivotally links to straight linkage 8 which also pivotally links to hook clamp 9 such that moving handle 2b results in movement of hook clamp 9 in the opposing direction.

In the driving configuration handle 2b is secured parallel to barrel 1 by spring clip 6. Plate 3a has a notch therein to mate with handle 2b and prevent movement of handle 2b. Hook clamp 9 hooks into retainer 12 under the lip of plate 3a and linkages 7 and 8 are tensioned by handle 2b thereby securing all moveable parts during driving. Linkages 7 and 8 and hook clamp 9 also act as a ballast to stabilise the device during use. Barrel 1 can then receive a post telescopically through its open end and the post will contact striker disc 5.

Using handles 2a and 2b the device can be lifted and driven downward to drive the post. The typical lift and fall of the device is approximately 400 millimeters and the force directed down onto the post drives the post into the ground. Repeating this action will drive the post further into the ground until it reaches the desired depth. Void 13 between striker disc 5 and the closed end of barrel 1 muffles the noise created by the impact with the post. Optionally a noise absorbing material can be placed in the void to enhance noise attenuation.

Figure 6:
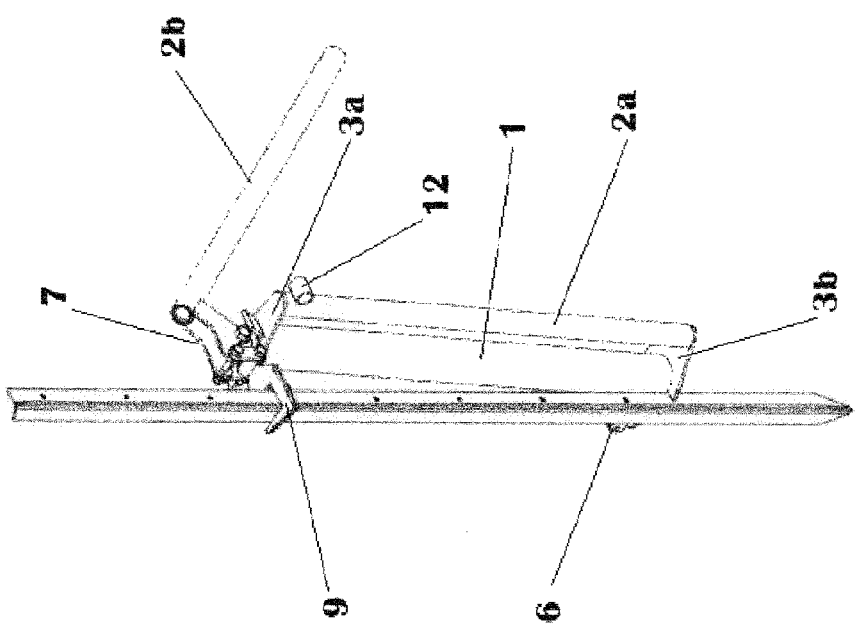
FIG. 6 is a perspective view of the device of FIG. 1 in the post pulling configuration.

Releasing spring clip 6 will convert the device to its extracting configuration. In the extracting configuration, as shown in FIG. 6, handle 2b swivels 90 degrees around the axis of barrel 1 and is raised and then lowered to lever hook clamp 9.

Hook clamp 9 hooks around the post to be extracted while notch 11 in plate 3b is adapted to receive the post and align the device during extraction. Raising handle 2b will lower hook clamp 9 such that it slides down the post and pressing handle 2b down will raise hook clamp 9. The lifting point on hook clamp 9 is offset and therefore, when an upward force is applied to the lifting point, hook clamp 9 will grip the post and pull the post from the ground. Repeating the process will progressively raise the post until it is at the desired height or has been extracted.

The device is easily converted back into the driving position for storage by inserting hook clamp 9 into retainer 12, moving handle 2b back into position parallel to barrel 1 and securing it with spring clip 6. Optionally, a plate (not shown) with a star picket shaped opening can be fixed over the open end of barrel 1 and used to twist a star picket to adjust its position as required. The device is made of steel and all joins are welded together.

The present invention provides a single device for both driving and extracting posts such as star pickets. The device quickly and easily converts from a driver to an extractor or vice versa without the need to remove bolts, add attachments or other time consuming processes. All moveable parts are securable making it easy to carry, transport and store. Having both a driver and extractor within the one device eliminates the need to carry two cumbersome devices.

The placement of a striker disc within the barrel to create a muffling space greatly reduces the noise produced during use. Therefore, the device is both safer and more convenient for the operator.

VARIATIONS

It will be realized that the foregoing has been given by way of illustrative example only and that all other modifications and variations as would be apparent to persons skilled in the art are deemed to fall within the broad scope and ambit of the invention as herein set forth.

Throughout the description and claims of this specification the words "comprise" and variations of that word such as "comprises" and "comprising" are not intended to exclude other additives components integers or steps.

The invention claimed is:

1. A device for driving and extracting a post comprising:
   a hollow barrel having one closed end and one open end for receiving the post, and
   two longitudinal handles, wherein at least one of said handle is pivotally mounted at the closed end of the barrel and releasably secured with a fastener at the open end, wherein the at least one of said handles is able to be secured and tensioned in a post driving configuration to prevent movement of the at least one of said handles so that said handles are utilised to facilitate driving of the post, and in an extracting configuration the at least one of said handles is able to be released and pivoted relative to the barrel to act as a lever for extracting the post.

2. The device of claim 1 wherein the closed end is closed by a plate, and wherein a striker disc is fixed within the barrel at the closed end with a void between the striker disc and the plate at the closed end of the barrel.

3. The device of claim 2 wherein a hook clamp is attached to the at least one of said handles by at least one linkage such that moving the at least one of said handles results in an opposing movement of the hook clamp.

4. The device of claim 3 wherein the handles are mounted between plates at the open and closed ends of the barrel.

5. The device of claim 4 wherein the at least one of said handles is pivoted at a pivot point to said plate at the closed end of the barrel.

6. The device of claim 3 further comprising a retainer to restrain the hook clamp when in the post driving configuration.

7. The device of claim 3 wherein the fastener is a spring clip.

8. The device of claim 1 wherein a hook clamp is attached to the at least one of said handles by at least one linkage such that moving the at least one of said handles results in an opposing movement of the hook clamp.

9. The device of claim 8 further comprising a retainer to restrain the hook clamp when in the post driving configuration.

10. The device of claim 1 wherein the handles are mounted between plates at the open and closed ends of the barrel.

11. The device of claim 10 wherein the at least one of said handles is pivoted at a pivot point to said plate at the closed end of the barrel.

12. The device of claim 1 wherein the fastener is a spring clip.

13. The device of claim 1 wherein the closed end is closed by a plate, and wherein the at least one of said handles is pivotally mounted at the plate of the closed end.

14. The device of claim 13 wherein a hook clamp is attached to the at least one of said handles by at least one linkage such that moving the at least one of said handles results in an opposing movement of the hook clamp.

15. The device of claim 14 wherein said at least one linkage is pivotally mounted at the plate of the closed end.

16. The device of claim 15 further comprising a retainer to restrain the hook clamp when in the post driving configuration.

17. A method of extracting a post from the ground, method comprising:
   providing a device for driving and extracting a post comprising:
      a hollow barrel having one closed end and one open end for receiving the post, and
      two longitudinal handles, wherein at least one of said handles is pivotally mounted at the closed end of the barrel and releasably secured with a fastener at the open end, wherein the at least one of said handles is able to be secured and tensioned in a post driving configuration to prevent movement of the at least one of said handles so that said handles are utilised to facilitate driving of the post;
   releasing the at least one of said handles and pivoting the at least one of said handles relative to the barrel; and
   using the released and pivoted at least one of said handles as a lever to facilitate extraction of the post from the ground.

18. The method of claim 17 wherein the closed end is closed by a plate, and wherein the at least one of said handles is pivotally mounted at the plate of the closed end.

19. The method of claim 18 wherein a hook clamp is attached to the at least one of said handles by at least one linkage such that moving the at least one of said handles results in an opposing movement of the hook clamp.

20. The method of claim 19 wherein said at least one linkage is pivotally mounted at the plate of the closed end.

* * * * *